United States Patent Office 3,480,633
Patented Nov. 25, 1969

---

3,480,633
2,3,4,6,7,12-HEXAHYDROINDOLO[2,3-a]QUINOLI-
ZINE-METHYL VINYL KETONE ADDUCTS
Robert Norman Schut, Edwardsburg, Mich., assignor to
Miles Laboratories Inc., Elkhart, Ind., a corporation
of Indiana
No Drawing. Filed Nov. 22, 1967, Ser. No. 684,914
Int. Cl. C07d 39/12
U.S. Cl. 260—288                                4 Claims

---

ABSTRACT OF THE DISCLOSURE

A series of 2, 3, 4, 6, 7, 12-hexadydroindolo [2, 3-a] quinolizine-methyl vinyl ketone adducts exhibiting a mydriatic activity characterized by pupillary dialtation. These compounds are prepared by reacting 2, 3, 4, 6, 7, 12-hexahydroindolo [2, 3-a] quinolizine with methyl vinyl ketone.

---

This invention relates to a series 2, 3, 4, 6, 7, 12-hexahydroindolo [2, 3-a] quinolizine-methyl vinyl ketone adducts displaying advantageous pharmacological properties. More particularly, this invention relates to 1, 12b-γ - oxotetramethyleneindolo [2,3-a] quinolizidine and 1, 12b-β-(3-oxobutyl)-γ-oxotetramethyleneindolo [2, 3-a] quinolizidine.

The novel compounds of this invention may be represented by the general structural formula:

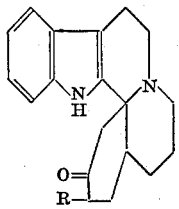

in which R is a member selected from the group consisting of hydrogen and oxobutyl.

The compounds of the invention are facilely prepared by reacting 2, 3, 4, 6, 7, 12-hexahydroindolo [2, 3-a] quinolizine with methyl vinyl ketone under suitable reaction conditions. The conditions of the reaction are not considered critical. However, the reactants are preferably stirred at room temperature or higher for a period of several hours to permit completion of the reaction. When equal molor quantities of the reactants are utilized a compound in which R is hydrogen is produced. When an excess quantity, preferably in excess of 2 to 1, of methyl vinyl ketone is used, a compound in which R is oxobutyl is produced.

Preparation of these novel compounds may be represented by the chemical equation

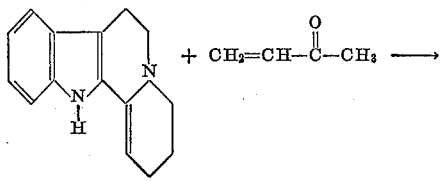

In this equation the final product will be determined by the quantity of methyl vinyl ketone utilized as stated.

Compounds of this invention may be utilized as free bases. Preferably, however, these compounds are used in the form of pharmacologically acceptable, non-toxic, water soluble, acid addition salts, for example, salts of mineral acids such as halogen acids or sulfuric acid, or organic acids such as citric acid, maleic acid, oxalic acid and other similar acids. The preparation of these acid addition salts is described in the following detailed examples and will not, therefore, be set forth at this point.

Medications may be prepared with these compounds as active ingredients using fillers, carriers, extenders, and excipients generally used in pharmaceutical formulations. Medications may be prepared in solid or liquid states as tablets, capsules, suspensions, and similar dosage forms suitable for intraperitoneal, topical and other convenient means of administration. The active ingredient may be mixed with common diluents or tableting adjuncts such as cellulose powder, cornstarch, lactose, talc and such, according to accepted manufacturing practices. Unit dosages of active ingredients in the medications may be varied so that an adequate amount is present to provide desired therapeutic results without untoward side effects and to permit satisfactory variations in dosages administered.

Medications particularly suited for topical applications to the eye may be formulated by mixing an active ingredient with a suitable viscous vehicle in a same solution. Advantageously, this medication for use in the eye with have a pH between about 6.5 and 7.2. In accordance with accepted pharmaceutical compounding precedures, appropriate preservatives and stabilizers may be added to form a beneficial medication.

The compounds of this invention have beneficial pharmacological properties. In particular, these compounds were observed to produce pupillary dilatation, a characteristic generally associated with mydriatic agents.

An aqueous solution was prepared according to accepted pharmaceutical practices with 1, 12b-γ-oxotetramethyleneindolo [2, 3-a] quinolizidine. This medication was administered intravenously to a test group of unanesthetized cats. With a dose of 10 mg./kg., pupillary dilatation was observed in the test animals.

A similar medication was administered intraperitoneally to a group of mice to determine the toxicity of the compound. An $LD_{50}$ (dose at which 50% of test animals die) of 68.1 mg./kg. was observed.

The invention will be further understood by reference to the following examples which describe specific compounds of the invention and processes for the preparation thereof. These examples are intended to be representative of the invention and not to limit the scope of the same which is properly set forth in the appended claims.

EXAMPLE 1

1,12b-γ-oxotetramethyleneindolo[2,3-a]
quinolizidine maleate

To a stirred solution of 11.2 g. (0.05 mole) of 2,3,4, 6,7,12-hexahydroindolo[2,3-a]quinolizine in 100 ml. of dry THF was added a solution of 3.50 g. (0.050 mole) of methyl vinyl ketone in 50 ml. of benzene over a 30 minute period. The solution was stirred at room temperature for 5 hours, after which the THF was removed in vacuo. The crude residue was dissolved in acetone-ether (1:1), a small amount of insoluble material was filtered and the filtrate treated with excess HCl in isopropyl alcohol. The solution was concentrated in vacuo, the residual crude salt stirred in ethyl acetate, collected and immediately dissolved in water. The free base was precipitated by addition of NaOH, collected and dissolved in $CHCl_3$.

Drying and concentration in vacuo give 10.7 g. of dark gum.

The crude product was redissolved in $CHCl_3$ and chromatographed on 200 g. of activated magnesium silicate (400 ml. fractions). Elution with U.S.P. ether gave 3.9 g. of product; stirring with ether gave 1.35 g. of white crystalline material, M.P. 172–177° C. Recrystallization from benzene-ether and dilution of the filtrate with n-hexane gave the analytical material M.P. 175–176° C.;

$\nu_{max.}^{CHCl_3}$ 3470, 3350 (N–H), 1715 (ketone C=O) cm.$^{-1}$;

$\lambda_{max.}^{MeOH}$ (neutral) 227, 283 m$\mu$.

*Analysis.*—Calcd. for $C_{19}H_{22}N_2O$: C, 77.55; H, 7.55; N, 9.52. Found: C, 77.46; H, 7.53; N, 9.43.

EXAMPLE 2

1,12b-$\beta$-(3-oxobutyl)-$\gamma$-oxotetramethyleneindolo[2,3-a]quinolizidine maleate A solution of 15 g. (0.21 mole) of methyl vinyl ketone in 100 ml. of benzene was added to a stirred solution of 11.2 g. (0.050 mole) of 2,3,4,6,7,12-hexahydroindolo[2,3-a]quinolizine in 100 ml. of dry THF (15 minute addition period). The solution warmed (24 to 28° C.) and took on a reddish color. After stirring for 3 hours at room temperature, the solvents were concentrated and the sticky residue stirred with U.S.P. ether. The yellow solid which formed was collected, washed with ether and dried; yield 14.0 g., M.P. 163–166° C.;

$\nu_{max.}^{CHCl_3}$ 3480, 1710 spike at 1620, medium bands at 1560, 1510 cm.$^{-1}$; $\lambda_{max.}^{MeOH}$ 228, 360 m$\mu$.

The crude product was converted into the hydrochloride; the salt was collected and then the free base was regenerated; yield, 3.97 g., M.P. 190–195° C. Two recrystallizations from acetone gave a white solid, M.P. 199–200° C., whose elemental analysis indicated the addition of 2 moles of methyl vinyl ketone to the starting indole. The infrared spectrum (KCl) showed strong C=O absorption at 1710$^{-1}$;

$\lambda_{max.}^{MeOH}$ 228 (19,200) and 284 (5830) m$\mu$.

The position of attachment of the oxobutyl group is assigned on the basis of consideration of steric factors.

*Analysis.*—Calcd. for $C_{28}H_{28}N_2O_2$: C, 75.82; H, 7.75; N, 7.69. Found: C, 75.39; H, 7.71; N, 7.61.

What is claimed is:
1. A compound selected from the group consisting of compounds of the formula:

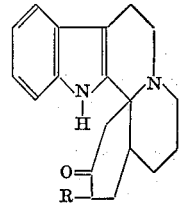

in which R is a member selected from the group consisting of H and oxobutyl and pharmacologically acceptable salts thereof.

2. A compound according to claim 1 which is 1,12b-$\gamma$-oxotetramethyleneindolo[2,3-a]quinolizidine.

3. A compound of claim 1 which is 1,12b-$\beta$-(3-oxobutyl)-$\gamma$-oxotetramethyleneindolo[2,3-a]quinolizidine.

4. A process for the preparation of a compound of claim 1 comprising reacting a compound of the formula:

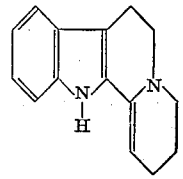

with methyl vinyl ketone to form the desired product.

References Cited

UNITED STATES PATENTS

| | | | | |
|---|---|---|---|---|
| 2,858,314 | 10/1958 | Georgian | | 260—287 |
| 3,029,247 | 4/1962 | Schut | | 260—296 |
| 3,087,930 | 4/1963 | Schut | | 260—288 |

OTHER REFERENCES

Schut et al. Jour. Het. Chem., vol. 3, p. 101 (1966).

DONALD G. DAUS, Primary Examiner

U.S. Cl. X.R.

260—296, 593, 286; 424—158